(12) United States Patent
Matsumoto

(10) Patent No.: US 6,459,956 B2
(45) Date of Patent: Oct. 1, 2002

(54) SAFETY DEVICE FOR USE WITH AN INDUSTRIAL ROBOT

(75) Inventor: Kazunori Matsumoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/812,909

(22) Filed: Mar. 21, 2001

(30) Foreign Application Priority Data

Mar. 28, 2000 (JP) .......................................... 2000-088018

(51) Int. Cl.⁷ ................................................ G06F 19/00
(52) U.S. Cl. ........................ 700/245; 700/247; 700/264; 318/563; 318/568.1; 318/568.11; 318/568.16; 318/568.24; 318/568.2; 901/3; 901/9; 901/17; 901/49; 701/23
(58) Field of Search ................................. 700/245, 247, 700/264; 318/563, 568.11, 568.16, 568.24, 568.1, 568.13, 568.2; 901/3, 9, 17, 49; 701/23; 200/1 V, 5 R

(56) References Cited

U.S. PATENT DOCUMENTS

| | | | | | |
|---|---|---|---|---|---|
| 4,078,158 | A | * | 3/1978 | Houee et al. | ........... 379/112.01 |
| 4,697,979 | A | * | 10/1987 | Nakashima et al. | ........ 180/2.1 |
| 4,835,730 | A | * | 5/1989 | Shimano et al. | ............ 700/247 |
| 5,212,433 | A | * | 5/1993 | Yasuyuki | .................... 200/1 V |
| 5,241,482 | A | * | 8/1993 | Ida et al. | .................... 340/3.32 |
| 5,367,595 | A | * | 11/1994 | Jennings et al. | ............... 385/59 |
| 5,402,512 | A | * | 3/1995 | Jennings et al. | ............. 385/114 |
| 5,444,342 | A | * | 8/1995 | Matsuo et al. | .............. 318/563 |
| 5,751,918 | A | * | 5/1998 | Shimogama et al. | ........ 318/563 |
| 6,292,712 | B1 | * | 9/2001 | Bullen | .......................... 700/17 |

FOREIGN PATENT DOCUMENTS

JP         5-329794         12/1993

* cited by examiner

Primary Examiner—Yonel Beaulieu
Assistant Examiner—McDieunel Marc
(74) Attorney, Agent, or Firm—McDermott, Will & Emery

(57) ABSTRACT

A robot system including a robot body, a plurality of safety devices to stop the operation of the robot body, connecting portions respectively disposed between the plurality of safety devices, and output device to transmit an output signal to external equipment. The safety devices are respectively connected in series to each other, and the output device is removably connected to at least one of the plurality of connecting portions. The robot body includes a plurality of robot bodies, and respective ones of the plurality of robot bodies are connected to the plurality of safety devices.

12 Claims, 2 Drawing Sheets

SAFETY DEVICE FOR USE WITH AN INDUSTRIAL ROBOT

FIELD OF THE INVENTION

The present invention relates to an industrial robot provided with a function to output the input from a safety device to external equipment.

BACKGROUND OF THE INVENTION

Recently, there is a strong demand for an industrial robot improved in safety and maintenance.

Generally, an industrial robot is provided with a function to transmit the input to a safety device in order to immediately stop the robot, and a function to output the input from the safety device to external equipment. The configuration of a conventional industrial robot is shown in FIG. 3 and FIG. 4. FIG. 3 is a circuit diagram of a safety device for a conventional robot. FIG. 4 is a block diagram of a conventional safety device.

In FIG. 3 and FIG. 4, a conventional industrial robot is provided with a robot body 18 and a safety device. The safety device serves a function to immediately stop the robot. The safety device includes a safety fence 12 and an input means. As the input means, for example, there are provided an emergency switch 11, a switch to check for opening/closing of the safety fence, and a deadman's switch 13 or like switches.

A contact type input means is generally used as an input means, and at the same time, a "b" contact is employed. The "b" contact is closed during normal service, and the contact opens when an emergency switch or the like is pressed.

Also, the industrial robot includes an output device 15 which outputs the input from the safety device to external equipment in order to immediately stop peripheral equipment 14 (e.g. a welder) according to the actuation of the safety device. That is, when the safety device is actuated, the peripheral equipment 14 will be immediately stopped by the output from the output device 15.

In such prior art output device 15, when a plurality of robot bodies are used, with both output means and input means of the safety device connected to all the plurality of robot bodies, and the safety device is actuated on one robot, then all the plurality of robots in operation will stop immediately.

In such prior art industrial robot, there will arise problems as described in the following.

In case a safety device is connected to peripheral equipment and it is necessary to initialize the safety device after recovery of the output from the safety device, the peripheral equipment must be initialized each time when the safety device is restored to its original condition after actuation of the safety device. Accordingly, it will take much time to restore the industrial robot to normal operation.

Also, a plurality of robots are used, and both input means and output means of the safety device are connected to the plurality of robot bodies so that all the robots then used will immediately stop when the safety device is actuated on any one of the plurality of robot bodies. In that case, a closed circuit is formed in the entire industrial robot system with respect to the output from the safety device, causing the industrial robot system to be deadlocked. As a result, it becomes very difficult to restore the industrial robot to normal operation.

The present invention provides an industrial robot improved in both maintenance and safety.

SUMMARY OF THE INVENTION

An industrial robot of the present invention comprises:
a robot body,
a plurality of safety devices to stop the operation of the robot body,
connecting portions disposed between respective ones of the plurality of safety devices, and
an output means to transmit output data to external equipment.

The safety devices are connected in series to each other, and the output means is removably connected to the connecting portion.

With this configuration, the industrial robot will be improved in both maintenance and safety.

DETAILED DESCRIPTION OF THE INVENTION

Figure 1:
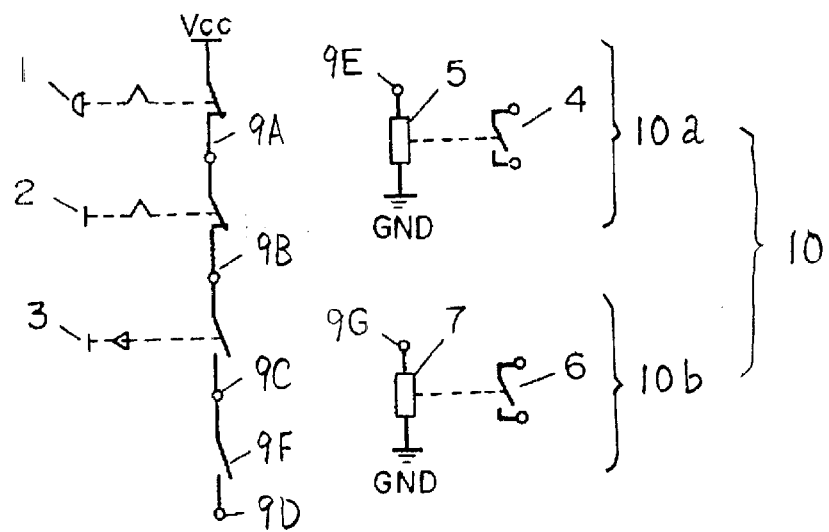
FIG. 1 is a circuit diagram of a safety device for an industrial robot in one embodiment of the present invention.

An industrial robot of the present invention comprises
a robot body,
a plurality of safety devices to stop the operation of the robot body,
connecting portions disposed between respective ones of the plurality of safety devices, and
an output means to transmit output data to external equipment,
wherein the safety devices are connected in series to each other, and
the output means is removably connected to the connecting portion, so as to put on and take off to the connecting portion.

Preferably, the connecting portion includes a plurality of connecting portions, and the output means is connected to at least one of the plurality of connecting portions.

That is, an industrial robot in one embodiment of the present invention comprises a robot body, a plurality of safety devices, and an output means. The plurality of safety devices are connected in series to each other. A plurality of connecting portions are formed between respective ones of the safety devices. The output means is removably attached to one of the connecting portions. The output means transmits the output to external equipment. With the plurality of safety devices actuated, the robot body stops operating.

Preferably, the robot body includes a plurality of robot bodies, and respective ones of the plurality of robot bodies are connected to the plurality of safety devices.

Preferably, the industrial robot further comprises an output means in addition to the output means connected to one of the plurality of connecting portions. The additional output means is connected in series to the plurality of connecting portions, and serves to transmit the output to external equipment. That is, the output means includes a first output means and a second output means. The first output means is connected to one of the plurality of connecting portions, and the second output means is connected in series to the other connecting portions.

Preferably, the output means includes a plurality of output means, and respective ones of the plurality of output means are connected to respective ones of the plurality of connecting portions.

Preferably, at least one of the plurality of safety devices is not connected to any output means. That is, the output means is not connected to at least one of the plurality of safety devices.

Preferably, the industrial robot further comprises a connector, and the output means is removably attached to one of the plurality of connecting portions via the connector.

The plurality of safety devices include at least two selected from the group consisting of an emergency switch, a safety fence, and a deadman's switch.

The output means includes a relay, and an output contact of the relay.

With the above configuration, without depending upon respective safety devices, besides an output means to transmit the input information from all safety devices to external equipment, whether or not the output is transmitted by individual safety devices can be set by hardware. Also, since there are provided a plurality of output means, it is not necessary to initialize the peripheral equipment after restoration of the safety device to its original condition. Further, even when the input means and output means of safety devices in a plurality of robot bodies are connected to each other, the robot system will never be deadlocked. As a result, the industrial robot will be improved in both maintenance and safety.

An industrial robot in an exemplary embodiment of the present invention will be described in the following with reference to FIG. 1 and FIG. 2.

Figure 2:
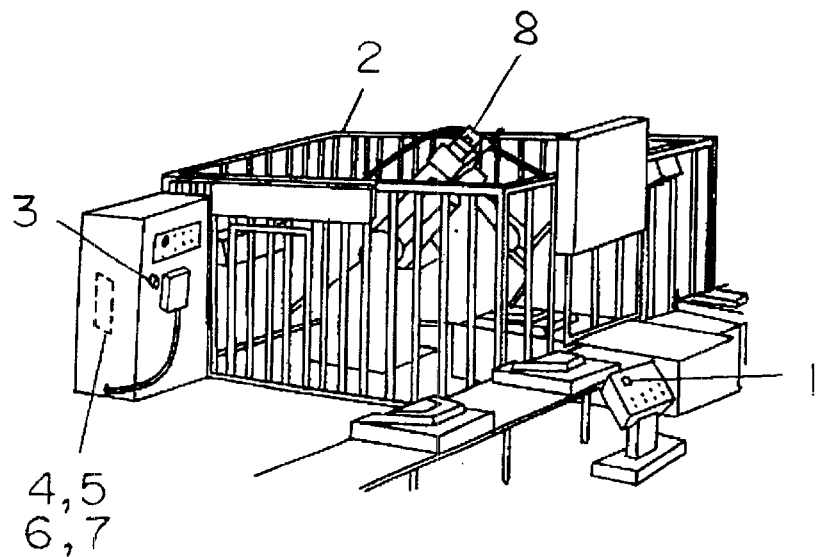
FIG. 2 is a block diagram of an industrial robot in one embodiment of the present invention.
Figure 3:
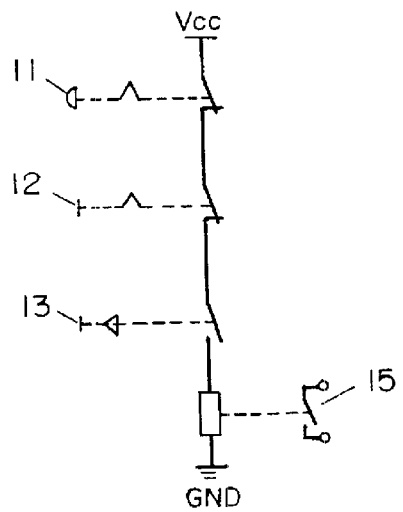
FIG. 3 is a circuit diagram of a safety device for a prior art industrial robot.
Figure 4:
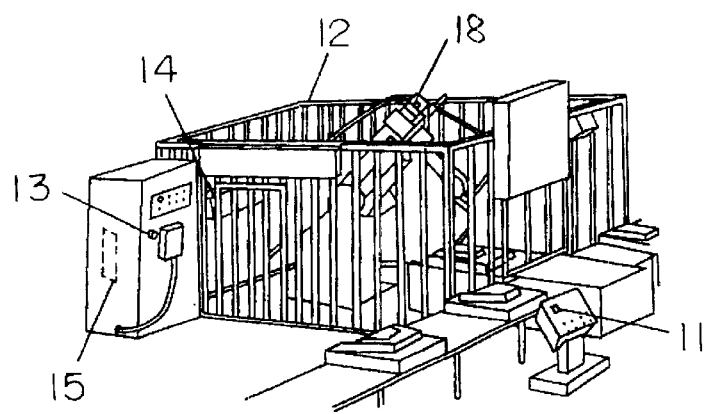
FIG. 4 is a block diagram of a prior art industrial robot.

In FIG. 1 and FIG. 2, the industrial robot comprises a robot body 8, a plurality of safety devices, and output means 10. The plurality of safety devices include an emergency switch 1, safety fence 2, and deadman's switch 3. The output means 10 transmits the output corresponding to the input to the safety device.

The output means includes a relay 5, and an output contact 4 of the relay 5.

The emergency switch 1, safety fence 2, and deadman's switch 3 are subjected to series connection. These safety devices 1, 2, 3 are connected by a plurality of connecting portions 9A, 9B, 9C, 9D. Point 9E of the relay 5 is connected to one connecting portion selected from connecting portions 9A, 9B, 9C. With this connection system, whether or not the output is transmitted by individual safety devices 1, 2, 3 can be set by hardware.

In this case, with point 9E connected to point 9A, the relay 5 transmits the output only when the emergency switch 1 is actuated. On the other hand, with point 9E connected to point 9B, the relay 5 transmits the output only when the emergency switch 1 and the safety fence 2 are actuated. Further, with point 9E connected to point 9C, the relay 5 transmits the output only when the emergency switch 1, the safety fence 2, and the deadman's switch 3 are actuated.

For example, when safety circuits frequently operate with deadman's switch 3 actuated, and no input is given to the safety device of peripheral equipment, then the point 9E is connected to the point 9B, and the output contact 4 of relay 5 will give the input to the safety device of peripheral equipment.

In the above configuration, it is also possible to use a configuration such that at least one of the plurality of safety devices 1, 2, 3 is not connected to the output means 10. With this configuration, the same performance as mentioned above may be obtained.

On the other hand, it is possible to use a configuration such that the output means 10 includes a plurality of output means 10a, 10b. That is, the output means includes a first output means 10a and a second output means 10b. Or, besides a first output means, a second output means is connected in series to a connecting portion. This configuration is described in the following. The second output means includes a relay 7, and an output contact 7 of the relay 7.

When a plurality of robot bodies are used with the input and output of the safety device of each robot body of the plurality of robot bodies connected to each other, then point 9G of the relay 7 is connected to point 9C, and output contact 6 of the relay 7 is connected to point 9F between point 9C and point 9D of another robot body. In the case of such connection, the industrial robot system will never be deadlocked even when a plurality of robot bodies are used.

The output means in the above configuration is removably connected to the connecting portion by means of a connector. Or, the output means is changed over by one connector. That is, the connection of the output means is changed over by changing the connection of the connector to another connecting portion. If the connector is not connected, the coils of relay 5 and relay 7 will become open without being excited, that is, the safety device is actuated. As a result, it is very easy to assure safety. Preferably, the configuration includes a shape or setting such that the connector cannot be connected to two devices. By using a connector having such special configuration, it is possible to prevent generation of two wrong settings.

In an industrial robot configured as described above, it is not necessary to initialize the peripheral equipment after recovery of the original condition of the safety device. Further, when a plurality of robot bodies are used with the input means and output means of safety devices of the plurality of robot bodies connected to each other, then whether or not the output is transmitted by individual safety devices can be optionally set in order to prevent the robot system from being deadlocked.

As described above, due to the configuration of the present invention, it is not necessary to initialize the peripheral equipment after recovery of the safety device. Further, the industrial robot system will never be deadlocked even when the input means and output means of safety devices of the plurality of robots are connected to each other. As a result, the robot system will be improved in both maintenance and safety.

What is claimed is:

1. An industrial robot, comprising:
    a robot body,
    a plurality of safety devices to stop operation of said robot body,
    a connecting portion disposed between respective ones of said plurality of safety devices, and
    an output means to transmit output data to external equipment,
    wherein each safety device of said safety devices is connected in series to each other, and said output means is removably connected to said connecting portion.

2. The industrial robot of claim 1,
    wherein said connecting portion includes a plurality of connecting portions, and
    said output means is connected to at least one of said plurality of connecting portions.

3. The industrial robot of claim 2,
    wherein said robot body comprises a plurality of robot bodies, and each robot body of said robot bodies is connected to said plurality of safety devices.

4. The industrial robot of claim 2, wherein said output means comprises a plurality of output means, and each output means of said plurality of output means is connected to respective one of said plurality of connecting portions.

5. The industrial robot of claim 2, wherein said output means includes a first output means and a second output means;

said first output means is connected to one connecting portion of said plurality of connecting portions; and said second output means is connected in series to the other connecting portion of said plurality of connecting portions.

6. The industrial robot of claim 2, wherein at least one of said plurality of safety devices is not connected to any one of said output means.

7. The industrial robot of claim 2, wherein said robot body comprises a plurality of robot bodies, said plurality of robot bodies having a first robot body and a second robot body;

said first robot body is connected to one end of said plurality of safety devices being connected in series to each other;

said output means includes input contact and output contact;

said second robot body is connected to one connecting portion of said plurality of connecting portions;

said input contact is connected to said one connecting portion; and said output contact is connected to one connecting portion of said second robot body.

8. The industrial robot of claim 1, further comprising a connector, wherein said output means is removably connected to said connecting portion via said connector.

9. The industrial robot of claim 1, wherein said plurality of safety devices include at least two selected from a group consisting of an emergency switch, a safety fence, and a deadman's switch.

10. The industrial robot of claim 1, wherein said output means includes a relay, and an output contact of said relay.

11. The industrial robot of claim 1, wherein said plurality of safety devices include an emergency switch, a safety fence, and a deadman's switch;

said connecting portion includes a first connecting portion positioned between said emergency switch 1 and said safety fence, and a second connecting portion positioned between said safety fence and said deadman's switch;

said output means includes a relay;

said relay is connected to said first connecting portion; and said relay transmits output when only emergency switch is actuated.

12. The industrial robot of claim 1, wherein said plurality of safety devices include an emergency switch, a safety fence, and a deadman's switch;

said connecting portion includes a first connecting portion positioned between said emergency switch and said safety fence, and a second connecting portion positioned between said safety fence and said deadman's switch;

said output means includes a relay;

said relay is connected to said second connecting portion; and said relay transmits output when both of said emergency switch and said safety fence are actuated.

* * * * *